(12) United States Patent
Siomina et al.

(10) Patent No.: US 9,642,021 B2
(45) Date of Patent: May 2, 2017

(54) ACQUISITION OF CELL INFORMATION FOR ENHANCING NETWORK OPERATION IN HETEROGENEOUS ENVIRONMENT

(75) Inventors: Iana Siomina, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/127,266

(22) PCT Filed: Apr. 21, 2011

(86) PCT No.: PCT/SE2011/050493
§ 371 (c)(1),
(2), (4) Date: Jun. 18, 2012

(87) PCT Pub. No.: WO2012/047144
PCT Pub. Date: Apr. 12, 2012

(65) Prior Publication Data
US 2013/0182583 A1    Jul. 18, 2013

Related U.S. Application Data

(60) Provisional application No. 61/389,417, filed on Oct. 4, 2010.

(51) Int. Cl.
*H04W 36/00* (2009.01)
*H04W 24/00* (2009.01)
(Continued)

(52) U.S. Cl.
CPC .......... *H04W 24/00* (2013.01); *H04W 24/10* (2013.01); *H04W 16/24* (2013.01); *H04W 16/32* (2013.01);
(Continued)

(58) Field of Classification Search
CPC ............. H04W 36/0088; H04W 24/10; H04W 72/0406; H04W 52/244; H04W 36/24
See application file for complete search history.

(56) References Cited

U.S. PATENT DOCUMENTS 6,285,874 B1 *  9/2001  Magnusson et al. ...... 455/456.1
7,929,970 B1 *  4/2011  Gunasekara et al. ......... 455/444
(Continued)

FOREIGN PATENT DOCUMENTS

EP    0 986 279 A1    3/2000
EP    1 458 209 A2    9/2004
(Continued)

OTHER PUBLICATIONS

International Search Report and Written Opinion mailed Jul. 26, 2011 in corresponding Application No. PCT/SE2011/050493.
(Continued)

*Primary Examiner* — Chirag Shah
*Assistant Examiner* — Jenkey Van
(74) *Attorney, Agent, or Firm* — Baker Botts, LLP

(57) ABSTRACT

A user equipment (UE) performs measurements on a serving cell and at least one neighbor cell in a heterogeneous wireless communications network that includes one or more higher power radio network nodes operating near one or more lower power radio network nodes. The UE acquires enhanced neighbor cell information (eNCI) including at least subframe information and determines an allowed set of one or more subframes during which the UE may make downlink and/or uplink measurements for at least one cell in the heterogeneous network. A network node in the heterogeneous network generates the eNCI, from which the UE may determine the allowed set of radio transmission sub- (Continued)

frames, and provides the eNCI for the UE to coordinate the UE measurements on the at least one cell during one or more of the allowed subframes.

29 Claims, 4 Drawing Sheets

(51) Int. Cl.
  *H04W 24/10* (2009.01)
  *H04W 16/24* (2009.01)
  *H04W 16/32* (2009.01)
  *H04W 48/12* (2009.01)
  *H04W 84/04* (2009.01)

(52) U.S. Cl.
  CPC .......... *H04W 48/12* (2013.01); *H04W 84/045* (2013.01); *Y02B 60/50* (2013.01)

(56) References Cited

U.S. PATENT DOCUMENTS

| | | | |
|---|---|---|---|
| 2007/0064655 A1 | 3/2007 | Ruuska | |
| 2007/0298780 A1* | 12/2007 | Lindoff | H04J 11/0093 455/423 |
| 2008/0318577 A1* | 12/2008 | Somasundaram et al. | 455/436 |
| 2009/0175179 A1* | 7/2009 | Stewart et al. | 370/252 |
| 2011/0275394 A1* | 11/2011 | Song et al. | 455/509 |
| 2011/0306340 A1* | 12/2011 | Lindoff et al. | 455/434 |

FOREIGN PATENT DOCUMENTS

| | | |
|---|---|---|
| RU | 2305902 C2 | 9/2007 |
| WO | WO 2004/079949 A1 | 9/2004 |

OTHER PUBLICATIONS

Ericsson: "On OTDOA method for LTE Positioning", 3GPP Draft; R1-090918, $3^{rd}$ Generation Partnership Project (3GPP), Mobile Competence Centre, Feb. 4, 2009, XP050318759.

Motorola: UE Considerations for Autonomous Muting in DL OTDOA, 3GPP Draft; R4-101322—UE Considerations for Autonomous Muting, $3^{rd}$ Generation Partnership Project (3GPP), Mobile Competence Centre, vol. RAN WG4, Dublin, Apr. 9, 2010, XP050427435.

ZTE: "Discussion on CRS Interference and CSI Measurements in Macro-Pico Deployment", 3GPP Draft; R1-105969_Final, $3^{rd}$ Generation Partnership Project (3GPP), Mobile Competence Centre; vol. RAN WG1, Nov. 10, 2010, XP050468188.

3GPP TS 36.331 (V9.3.0 (Jun. 2010), $3^{rd}$ Generation Partnership Project: Technical Specification Group Radio Access Network; Evolved Universal Terrestrial Radio Access (E-UTRA); Radio Resource Control (RRC); Protocol specification (Release 9), TOC + pp. 1-250.

3GPP TSG RAN WG1 Meeting #60bis; Beijing, China; Source: LG Electronics; Title: Methods to facilitate the inter-cell coordination in heterogeneous networks (R1-102431), Apr. 12-16, 2010.

3GPP TSG-RAN WG1 #62; Madrid, Spain; Source: Qualcomm Incorporated; Title: Data channel ICIC and the benefits of possible extensions R1-104819), Aug. 23-27, 2010.

Russian Official Action for Application No. 2013120325 (with translation), Feb. 26, 2015.

Russian Federation Decision to Grant, Application No. 2013120325; Reference No. 2412-195174RU/1162 of Aug. 3, 2015; with English Translation entitled "Decision on Grant a Patent for Invention," Date of Receipt: Nov. 24, 2015.

* cited by examiner

ACQUISITION OF CELL INFORMATION
FOR ENHANCING NETWORK OPERATION
IN HETEROGENEOUS ENVIRONMENT

PROVISIONAL APPLICATION

This application is the U.S. national phase of International Application No. PCT/SE2011/050493 filed 21 Apr. 2011 which designated the U.S. and claims priority to U.S. Provisional Application No. 61/389,417 filed 4 Oct. 2010, the entire contents of each of which are hereby incorporated by reference.

TECHNICAL FIELD

The technology relates to interference coordination in wireless networks, and in particular, to wireless networks where some nodes or terminals rely on the availability of the information about multiple cells.

BACKGROUND

The interest in deploying low-power nodes (such as pico base stations, home eNodeBs, relays, remote radio heads, etc.) for enhancing the macro network performance in terms of the network coverage, network capacity, and service experience of individual users has been constantly increasing over the last few years. At the same time, there is a need for enhanced interference management techniques to address the arising interference issues caused, for example, by a significant transmit power variation among different cells and cell association techniques developed earlier for more uniform networks.

In 3 GPP, heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e., small geographical areas with a higher user density and/or higher traffic intensity where installation of pico nodes may be considered to enhance performance. Heterogeneous deployments may also be viewed as a way of densifying networks to adapt to traffic needs and the environment. However, heterogeneous deployments also bring challenges for which the network should be prepared to ensure efficient network operation and superior user experience.

Currently, there are three LTE base station (BS) power classes specified: wide area BS, local area BS and home BS. But additional BS classes, such as medium range BS, are expected to be introduced in the near future. The base station classes differ in that they have different levels of maximum output power and associated minimum coupling loss. This in turn defines the maximum and a typical coverage area or the size of a cell which may be efficiently served by a particular type of base station. For example, a wide area BS is typically deployed to serve a macro cell or a wide area. Hence, a wide area. BS is interchangeably termed a macro BS. On the other hand, a local area BS is typically deployed to serve a pico cell or a local area. Thus, a local area BS is interchangeably termed a pico BS. A medium range BS is typically deployed to serve a micro cell or a medium range area. So a medium range BS is interchangeably termed a micro BS. Some other requirements such as frequency error and receiver sensitivity may also differ for different BS classes as they are generally optimized for specific deployment scenarios. In LTE, the maximum output power of a local area BS, which serves a pico cell, and a home BS, which serves a femto cell, is 24 dBm and 20 dBm for a non-MIMO case, respectively. For example, in both WCDMA and E-UTRAN FDD and TDD, the home base station maximum output power is 17 dBm per antenna port in case of two transmit antennas, 14 dBm per antenna port in case of four transmit antennas, and so on.

Interference Management for Heterogeneous Deployments

To ensure reliable and high-bitrate transmissions as well as robust control channel performance, maintaining a good signal quality is a must in wireless networks. The signal quality is determined by the received signal strength and its relation to the total interference and noise received by the receiver. A good network plan including cell planning is a prerequisite for the successful network operation, but it is static. For more efficient radio resource utilization, the plan may be complemented at least by semi-static and dynamic radio resource management mechanisms, which are also intended to facilitate interference management and deploy more advanced antenna technologies and algorithms.

One way to handle interference is, for example, to adopt more advanced transceiver technologies, e.g. by implementing interference cancellation mechanisms in terminals. Another way, which may be complementary to the former, is to design efficient interference coordination algorithms and transmission schemes in the network.

Inter-cell interference coordination (ICIC) methods for coordinating data transmissions between cells have been specified in LTE release 8, where the exchange of ICIC information between cells in LTE is carried out via the X2 interface by the X2-AP protocol. Based on this information, the network may dynamically coordinate data transmissions in different cells in the time-frequency domain and also perform transmit power control so that the negative impact of inter-cell interference is minimized or at least reduced. With such coordination, base stations may optimize their resource allocation by cells either autonomously or via another network node ensuring centralized or semi-centralized resource coordination in the network. In the current 3 GPP specification, such coordination is typically transparent to UEs. Two examples of coordinating interference on data channels are illustrated in FIG. 1. In example (1), data transmissions in two cells belong to different layers, i.e. macro and pico layers, are separated in frequency. In example (2), low-interference conditions are created at some time instances for data transmissions in pico cells by suppressing macro-cell transmissions in these time instances, e.g., in order to enhance performance of UEs which would otherwise experience strong interference from macro cells, e.g., UEs closely located to macro cells.

Unlike data channels, in the current 3 GPP specification, ICIC possibilities for control channels are more limited. For example, the mechanisms illustrated in FIG. 1 are not provided for control channels or for reference signals which are measured, e.g., for mobility. Three enhanced ICIC approaches to handle the interference on control channels are illustrated in FIG. 2. Examples (1) and (3) require standardization changes, while example (2) may be implemented with the current 3 GPP standard but is limited for time division duplex (TDD) (not possible with synchronous network deployments) and is not efficient at high traffic loads. From a legacy terminal point of view, Cell-Specific Reference Signals (CRS) still need to be transmitted in all subframes, so there will still be inter-cell interference from CRS.

The idea behind interference coordination techniques, as illustrated in FIGS. 1 and 2, is that the interference from a strong interferer (e.g., a macro cell base station) is suppressed during the weaker cell's (e.g., a pico cell base station) transmissions, assuming that the weaker cell is aware of radio resources with low-interference conditions and thus may prioritize scheduling in those subframes the transmissions for users which potentially may strongly suffer from the interference caused by the strong interferers.

Although the possibilities to efficiently mitigate inter-cell interference to and from control channels are limited with the current 3 GPP standard, even less flexibility exists for dealing with interference to/from physical signals which typically have a pre-defined static resource allocation in the time-frequency space. There are three known techniques. One is signal cancellation where the channel is measured and used to restore the signal from (a limited number of) the strongest interferers. But this technique negatively impacts the receiver implementation and complexity, and channel estimation effectively limits how much of the signal energy that may be subtracted. Another is symbol-level time shifting which does not impact the standard, but is not relevant for TDD networks and networks providing an MBMS service. A third technique is complete signal muting in a subframe, e.g., not transmitting CRS in some subframes for energy efficiency reasons.

Given the limited set of techniques, all of which have drawbacks, there is a need for a simple and efficient technique to resolve the CRS interference issue. A similar issue exists for synchronization and broadcast channels.

Cell Range Expansion

The need for enhanced ICIC techniques is particularly important when the cell assignment rule diverges from a Reference Signal Received Power (RSRP)-based approach towards a pathloss-based or pathgain-based approach. This is sometimes also referred to as cell range expansion when adopted for cells with a transmit power lower than neighbor cells. The idea of the cell range expansion is illustrated in FIG. 3, where the cell range expansion of a pico cell is implemented using a delta-parameter added to RSRP.

UE Awareness about eICIC-Related Cell Configuration

Different interference coordination techniques, also referred to as enhanced ICIC (eICIC), may be used in heterogeneous network deployments. Furthermore, to ensure robust performance for data and/or control channels and to ensure consistent UE measurements, e.g. mobility measurements, positioning measurements, channel estimation measurement, etc., in the presence of time-frequency radio resources with different interference conditions, the UE typically needs information to determine which radio resources may/should be used for those measurements that also keep the UE performance at an acceptable level. It is important to provide the UE such information and an appropriate way to provide it.

Neighbor Cell Lists in LTE

Neighbor cell lists (NCLs) are used for mobility purposes. Transmitting neighbor cell lists from the E-UTRA radio network to the UE is a required feature in 3 GPP TS 36.331, and it is optional in LTE in that the UE must meet measurement requirements (e.g., for cell search, RSRP and RSRQ accuracy) without receiving an explicit neighbor cell list from the eNode B. A similar functionality (signaling of NCL) is required in UTRA where the UE must meet more stringent measurement requirements (e.g., cell search, CPICH RSCP and CPICH Ec/No accuracy) only when an explicit neighbor cell list is signaled by the radio network controller (RNC).

In E-UTRAN, the neighbor cell information in E-UTRA may be signaled over RRC either on the Broadcast Control Channel (BCCH) logical channel in a system information block or on the Dedicated Control Channel (DCCH) in an RRC measurement configuration or reconfiguration message.

When signaled on BCCH, the neighbor cell related information for intra-frequency cell re-selection is signaled in the Information Element (IE) SystemInformationBlockType4, and the IE SystemInformationBlockType5 is used for inter-frequency cell re-selection. Both system information blocks (SIBs) are signaled over RRC dedicated signaling in the System Information (SI) message through the BCCH logical channel using RLC transparent-mode service. This SI with neighbor cell information may be acquired both in RRC_IDLE and RRC-CONNECTED states. Mapping of SIBs to SI messages is configurable by a schedulingInfoList with the restrictions that each SIB is contained in a single SI message and only SIBs having the same scheduling requirement (periodicity) may be mapped to the same SI message. The transmit periodicity of SIB4 and SIB5 may be configured as one of: 8, 16, 32, 64, 128, 256 and 512 radio frames.

The neighbor cell related information for intra-frequency cell re-selection is signaled in the IE SystemInfonnationBlockType4 includes cells with specific re-selection parameters as well as blacklisted cells. The maximum number of cells in intra-frequency NCLs or black cell list (BCL) is 16 cells. An NCL contains the Physical Cell Identities (PCIs) and corresponding cell offsets which are used to indicate a cell-specific or frequency-specific offset to be applied when evaluating candidates for cell re-selection or when evaluating triggering conditions for measurement reporting. A Black Cell List (BCL) contains a range of physical cell identities including the starting (lowest) cell identity in the range and the number of identities in the range. The Physical Cell Identity range is specified in 3 GPP TS 36.331 as follows:

| PhysCellIdRange ::= | SEQUENCE { |
|---|---|
| start | PhysCellId, |
| range | ENUMERATED { |
| | n4, n8, n12, n16, n24, n32, n48, n64, n84, |
| | n96, n128, n168, n252, n504, |
| spare2, | |
| | spare1}    OPTIONAL -- |
| Need OP | |
| } | |

The neighbor cell related information for inter-frequency cell re-selection signaled in the IE SystemInfonnationBlockType5 includes cell re-selection parameters common for a frequency as well as cell specific re-selection parameters. With the current 3 GPP specification, the parameters signalled per carrier frequency and optionally per cell include: carrier frequency (or ARFCN), an indicator for the presence of antenna port 1, allowed measured bandwidth, reselection parameters accounting for RSRP, an indicator for the required minimum received RSRP in the E-UTRAN cell, a reselection timer value for E-UTRA indicating the time during which the cell has to be evaluated and ranked, reselection thresholds for RSRP when reselecting toward a higher and a lower priority, and neighbor cell configuration—a bit string of two bits, used to provide the information related to MBSFN and TDD UL/DL configuration of neighbor cells (00—not all neighbor cells have the same MBSFN subframe allocation as serving cell, 10—the MBSFN subframe allocations of all neighbour cells are identical to or subsets of that in the serving cell, 01-no MBSFN subframes are present in all neighbour cells, and 11-different UL/DL allocation in neighbouring cells for TDD compared to the serving cell, for TDD, 00, 10 and 01 are only used for same UL/DL allocation in neighbouring cells compared to the serving cell).

The optional parameters that may be signalled with the current 3 GPP specification for inter-frequency NCL, per carrier frequency or per cell, include: offset (0 dB default), maximum UE transmit power (if absent the UE applies the maximum power according to the UE capability), speed-dependent scaling factor for the E-UTRA reselection timer value, absolute cell reselection priority of the concerned carrier frequency/set of frequencies, reselection thresholds for RSRP when reselecting towards a higher and a lower priority, and inter-frequency BCL.

As specified in 3 GPP TS 36.331, no UE requirements related to the contents of SystemInformationBlock4 or SystemInformationBlock5, which carry intra- and inter-frequency NCI, respectively, apply other than those specified elsewhere, e.g., within procedures using the concerned system information, and/or within the corresponding field descriptions. So in E-UTRA, the UE must meet the measurement requirements without having the NCL. But on the other hand, if the NCL is signaled, the UE must meet the current measurement requirements since the UE may ignore the NCL or complement it with a blind cell search.

To enhance the operation of heterogeneous networks, it would be helpful if UEs could obtain information about neighbor cells. However, known techniques do not specify when, how, or via which network nodes neighbor cell information may be acquired by UEs. Nor this information communicated among different network nodes. Another problem is that non-full duplex is not accounted for in such neighbor cell information. Unfortunately, the neighbor cell information defined by the current 3 GPP standard for the mobility purposes is not sufficient to ensure robust channel performance in heterogeneous networks and thus needs to be enhanced. Such an enhancement is particularly desirable for intra-frequency cells in co-channel heterogeneous network deployments. Furthermore, neighbor cell lists may not always be necessary—even in heterogeneous networks. So to avoid signaling overhead involved in sending NCLs, network efforts for creating NCLs, and UE efforts for receiving and processing such NCL information when it may not be required, some pre-defined rules for UE terminal behavior need to be specified. Furthermore, UE measurement requirements should also account for such rules.

SUMMARY

The technology in this application manages and communicates enhanced neighbor cell information (eNCI) for efficient operation of heterogeneous networks. Various example aspects of the technology include one or more network nodes: creating enhanced neighbor cell information (eNCI), signaling eNCI among network nodes, and/or providing the eNCI to UEs.

One aspect of the technology relates to a radio user equipment (UE) that performs measurements on a serving cell and at least one neighbor cell in a heterogeneous wireless communications network. The heterogeneous network includes one or more higher power radio network nodes (wide area base station, BS) operating near one or more lower power radio network nodes (local area BS, medium range BS, home BS, micro BS). The UE acquires enhanced neighbor cell information including at least subframe information and determines an allowed set of one or more subframes, (typically, the number of allowed subframes in a frame is less than a total number of subframes in the frame), during which downlink and/or uplink measurements may be performed for at least one cell in the heterogeneous network. The UE uses the acquired enhanced neighbor cell information to perform measurements on the at least one cell in the heterogeneous network during the allowed set of one or more subframes. During the allowed set of one or more subframes, radio interference from the one or more higher power radio network nodes is reduced which facilitates the UE's downlink and/or uplink measurements for the at least one lower power cell.

The enhanced neighbor cell information may be acquired in different ways such as from a received message received from a radio network node and/or based on predetermined rules stored in the UE. For example, according to one of the predetermined rules, the UE uses enhanced neighbor cell information corresponding to a configuration of the serving cell for performing measurement on at least one neighbor cell. For another example rule, the UE uses the same enhanced neighbor cell information for performing measurement on multiple cells. The multiple cells may be on a same frequency or a different frequency and belong to a same radio access technology, RAT, or a different RAT. Moreover, the multiple cells may include both serving and neighboring cells, or only neighboring cells.

In one example implementation, a subset of the enhanced neighbor cell information for performing measurements on the serving cell may be used as the eNCI for performing measurements on neighboring cells. Another example uses a superset of the enhanced neighbor cell information for performing measurements on the serving cell may be used as the eNCI for performing measurements on neighboring cells. Another alternative uses the same enhanced neighbor cell information for both neighboring and serving cells.

In a non-limiting example embodiment, the enhanced neighbor cell information includes an allowed set of uplink, UL, and/or downlink, DL, subframes during which the UE may make cell measurements in the heterogeneous network. The allowed set of UL and/or DL subframes may be designated using an UL and/or DL subframe configuration that supports a non-full duplex mode of operation. The enhanced neighbor cell information also or alternatively include one or both of cell-specific timing offset information or cell type indication for each cell to be measured.

Other non-limiting examples of enhanced neighbor cell information include one or more of the following: intra-frequency cell information for performing intra-frequency measurements, multi-carrier cell information for performing inter-frequency measurements and/or carrier aggregation measurements, multi-radio access technology, RAT, information for performing inter-RAT measurements, a set of cells for the UE to measure, a set of frequencies for the UE to measure, or a cell identifier enabling enhanced cell information.

In a non-limiting example embodiment, one or more UE measurements of at least one cell is performed when a number of allowed subframes in a frame and an available bandwidth for performing cell measurement are above respective thresholds. Alternatively, one or more triggers may initiate UE measurements during one or more of the allowed subframes.

In another non-limiting example embodiment, the UE may separately acquire enhanced neighbor cell information for performing measurement on a serving cell, on intra-frequency neighbor cells, on inter-frequency neighbor cells, and on inter-RAT neighbor cells.

Another aspect of the technology relates to a network node in a heterogeneous network. The network node generates enhanced neighbor cell information including subframe information from which a UE may determine an allowed set of the radio transmission subframes during which the UE may make downlink and/or uplink cell measurements for at least one cell in the heterogeneous network. The enhanced neighbor cell information is then provided to coordinate UE measurements on at least one cell in the heterogeneous network during the allowed set of one or more subframes. During the allowed set of subframes, radio interference from the one or more higher power radio network nodes is reduced to facilitate the UE measurements for the at least one lower power cell. In one example embodiment, the enhanced neighbor cell information may be sent to another network node in the heterogeneous network.

DETAILED DESCRIPTION

Figure 1:
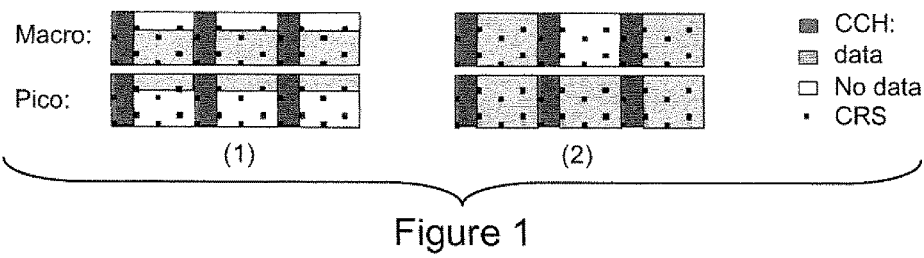
FIG. 1 illustrates ICIC for data channels in frequency and using low interference subframes.
Figure 2:
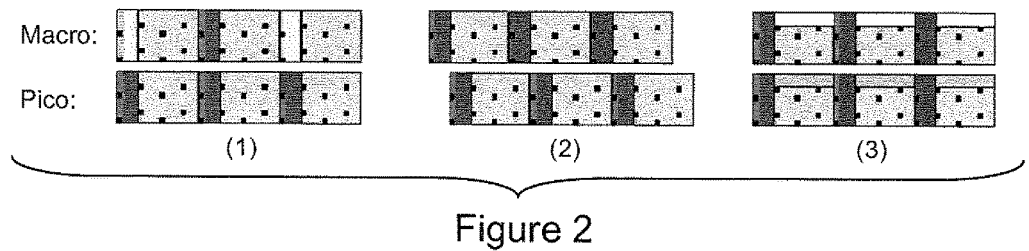
FIG. 2 illustrates ICIC for control channels in various configurations.
Figure 3:
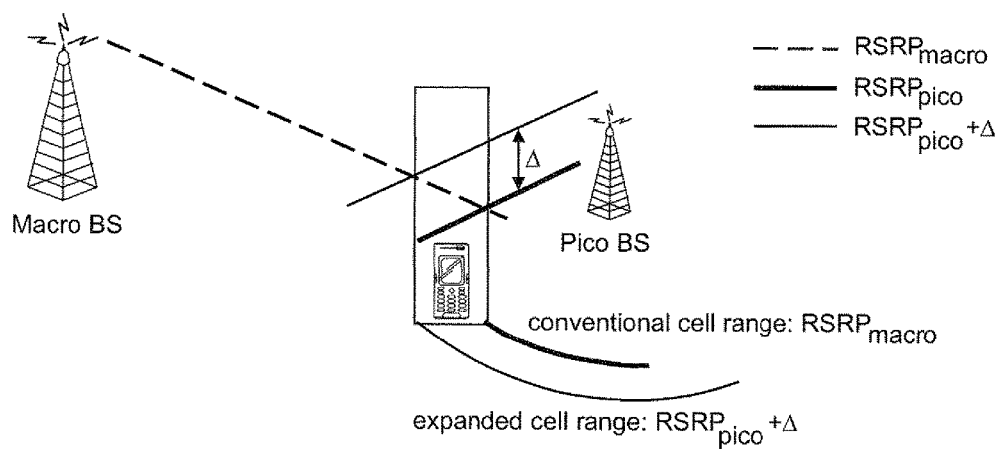
FIG. 3 illustrates cell range expansion in a heterogeneous network.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein may represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the non-limiting example embodiments described below relate to an LTE system, the technology may be applied to any single-radio access technology (RAT) or multi-RAT cellular communications system. Similarly, even though the description is given in the context of heterogeneous deployments, it is not limited to them or to the 3 GPP definition of heterogeneous network deployments. For example, the technology in this application may used for traditional macro deployments and/or networks operating more than one radio access technology (RAT). Herein, a UE is understood to be any type of mobile radio node capable of performing measurements on multiple cells, e.g., UE, terminal, laptop, PDAs, small base stations, sensors, relays, etc. A network node may be a base station node, relay node, base station control node, or core network node.

Figure 4:
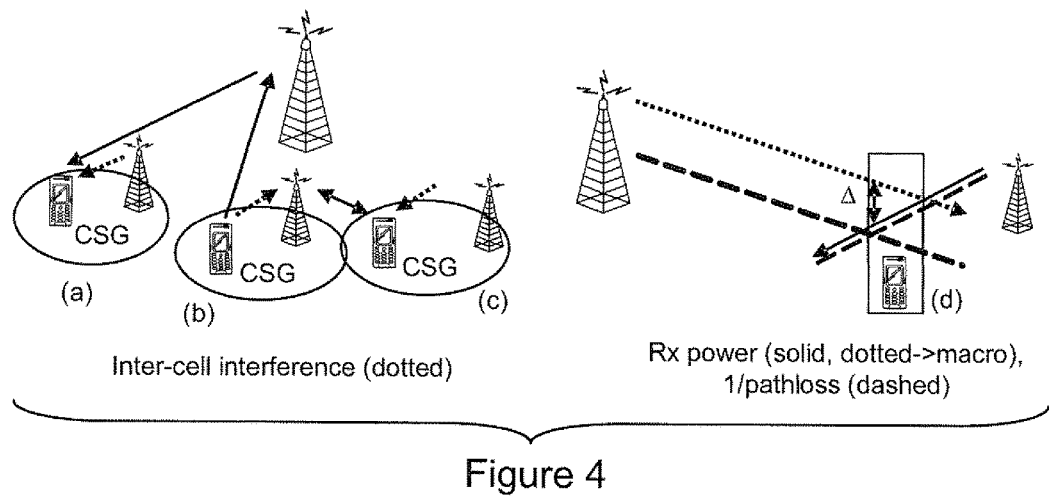
FIG. 4 illustrates several situations possible in a heterogeneous network.

LTE-Advanced (Long-Term Evolution) is currently standardized in 3 GPP (3 rd Generation Partnership Project). A non-limiting example diagram of a heterogeneous network deployment where lower power radio nodes serving smaller micro cells (e.g., pico/femto base stations) are placed throughout a macro-cell layout that includes one or more higher-power macro radio base station or relay nodes, each serving a larger macro cell, is shown in FIG. 4 where a macro UE is served by a macro cell, and a micro UE is served by a micro cell. In case (a) shown in FIG. 4, a home eNode B (HeNB) interferes with a macro UE with no access to a closed subscriber group (CSG) cell. In case (b) shown in FIG. 4, a macro UE's transmissions cause interference for a micro cell base station. In case (c) shown in FIG. 4, another base station in an adjacent micro cell interferes with a CSG UE. Case (d) in FIG. 4 shows that path-loss based cell association (e.g., by using biased RSRP reports) may improve the uplink interference but at the cost of increasing the downlink interference of micro UEs at the cell edge.

FIG. 4 then illustrates several examples where it is difficult for a UE to accurately perform cell measurements associated with victim cells because of interference associated with one or more "aggressor" cells. Non-limiting, example cell measurements include signal strength or quality measurements, radio link monitoring, time-based measurements (e.g., for UE position determination), self-organizing network (SON) measurements for network planning, minimization of drive test (MDT) measurements, etc. Although non-limiting examples are given with an aggressor macro cell and a victim micro cell, the technology applies to any aggressor cell-victim cell scenario regardless of cell size, radio node class, or radio node output power. The inventors recognized this aggressor cell interference problem and conceived of a way to coordinate UE measurements in a heterogeneous network to avoid or at least reduce aggressor cell interference during one or more allowed times when the UE may make victim cell measurements. More specifically, enhanced neighbor cell information (eNCI) is used to accomplish this reduced aggressor cell interference for UE victim cell measurements.

Figure 5:
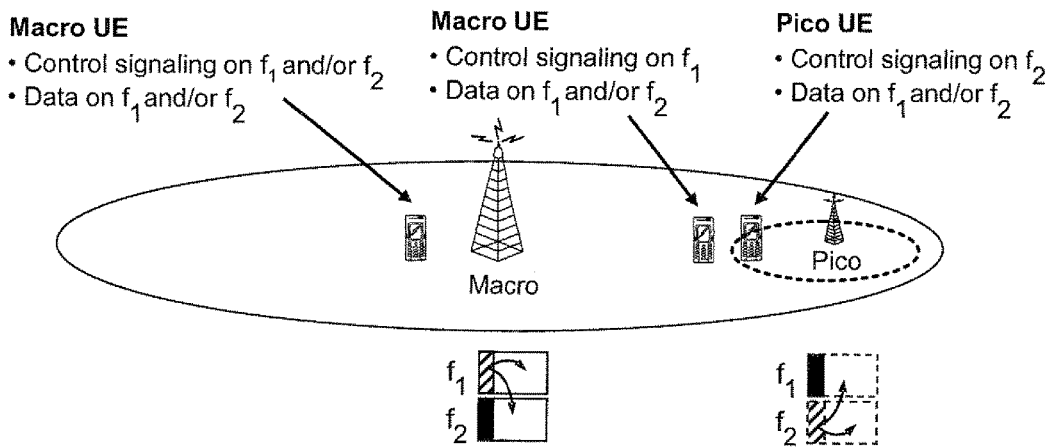
FIG. 5 illustrates examples of control and data signaling a heterogeneous network.

Although the interference coordination is described for co-channel heterogeneous deployments, the techniques may also be useful when there is a possibility to use multiple frequencies or implement carrier aggregation. Carrier aggregation (CA) with cross-carrier scheduling using common intermediate format (CIF) may be used for heterogeneous deployments but is not required. A non-limiting example is shown in FIG. 5. Downlink interference for control signaling may be handled by partitioning component carriers in each "cell layer" (a cell layer includes for example one or more macro base stations and one or more micro base stations all operating on the same frequency) into two sets, one set used for data and control and one set used mainly for data and possibly control signaling with reduced transmission power. To ensure interference coordination on the control channels and for data scheduling, the network nodes need to be aware of the potential interference from neighbor nodes which reveals the need for inter-node communication about the resources used by the nodes. Furthermore, for measurements based on signals that are common for all UEs in the cell, e.g., CRS, the UEs also need to be informed when the measurements may be performed under improved interference conditions. CRS and data may also be transmitted on both frequencies f1 and f2.

Enhanced neighbor cell information (eNCI) may be employed to improve network operation and performance in heterogenous deployments as well as other types of deployments. The eNCI includes at least downlink subframe information from which the UE may determine an allowed set of subframes during which the UE may make cell measurements in the heterogeneous network. Typically, the number of the allowed downlink subframes is less than the total number of downlink subframes. A non-exhaustive, non-limiting, and example list of possible additional eNCI includes one or more of the following:

1—inter-frequency cell information, as described above in the background, like carrier frequency, indicator for the presence of antenna port 1, cell reselection parameters accounting for RSRP, neighbor cell configuration, power offset, maximum UE transmit power, speed-dependent scaling factor for the E-UTRA reselection timer value, absolute cell reselection priority of the concerned carrier frequency/ set of frequencies, cell reselection thresholds for RSRP when reselecting towards a higher and a lower priority, and/or inter-frequency black cell list (BCL), may also be indicated for intra-frequency victim cells, multi-carrier victim cells, and/or multi-RAT victim cells including LTE FDD or LTE TDD;

2—the number of cells for the UE to measure: a larger number of cells, e.g., 24 or 32 cells, may be used for eNCI as compared to typical NCLs currently defined for mobility;

3—the number of victim cell frequencies for the UE to measure: a smaller number of frequencies (e.g., less than eight) may be used for eNCI as compared to the number of frequencies in typical NCLs;

4—a number of antenna ports for the UE to use in its victim cell measurements, an indication to use more than 2 antenna ports (e.g., other than antenna ports 0 and 1), or an indication that the same set and/or number of antenna ports used in all cells may also be used for at least one cell in the NCL;

5—use a non-continuous block of cell IDs either for NCL or BCL in the UE's victim cell measurements, where the block may be determined, e.g., by a step factor or a mask to select a subset of cells within a Physical ID cell range or set of ranges;

6—an uplink (UL)/downlink (DL) subframe configuration supporting non-full duplex mode that specifies both allowed uplink and downlink subframes during which the UE may make victim cell measurements;

7—a victim cell timing offset, e.g. a number of subframes between cells for one or more of the victim cells the UE is to measure (e.g., the offset may be of subframe 0 of one cell from subframe 0 of another cell);

8—a subframe configuration for eICIC before the DL information is available; and 9—cell type indication such as macro, micro, pico, home/ femto base station, etc.

To elaborate on the number cells to measure as an example of eNCI, a discontinuous range of Physical Cell IDs (PCIs) may be specified to account, e.g., see the planned PCI reuse among different radio network node layers such as macro and pico or femto described in PCT/SE2010/051432 and U.S. patent application Ser. No. 12/976,225, filed on Dec. 22, 2010, the disclosures of which are incorporated herein by reference. In one non-limiting example embodiment, a step factor is added in the description of a PhysCellIdRange element, where the step is e.g. 2, 3, 4, 6, 8, or 9, and the step is specified e.g. as follows:

```
PhysCellIdRange ::=   SEQUENCE {
     start            PhysCellId,
     range            ENUMERATED {
                        n4, n8, n12, n16, n24, n32, n48, n64, n84,
                        n96, n128, n168, n252, n504, spare2,
                        spare1},          OPTIONAL  -- Need
OP
     step             ENUMERATED {
                        n2, n3, n4, n6, n8, n9}   OPTIONAL
}
```

This step factor may correspond to a certain cell plan (e.g., every third cell ID is a macro cell) and may be applied when defining NCL or BCL. For example, pico cells IDs may be PCI mod 3=0 and macro cell IDs may be PCI mod 2>0 to avoid collisions of macro CRS with pico CRS by exploiting planned PCI reuse among layers. A similar functionality may be defined with a mask parameter, e.g., defined as a string of bits with associated rules, where the PCIs selected with the mask correspond to one group of cells for the UE to measure. Furthermore, the same parameters (e.g., cell re-selection parameters) may be configured for cells that belong to the same group of cells. Also, a non-continuous block of cell IDs may be defined as a sequence enumerating cell IDs or a sequence of the currently defined cell ranges of cells for which common information is defined. This approach reduces signaling overhead and simplifies signaling.

The neighbor cell configuration in eNCI, i.e., configuration of neighboring cells, may be adapted to indicate configuration of non-full duplex mode in neighbor cells. In one non-limiting example embodiment, a two-bit neighbor cell configuration may be adapted to allow for a flexible UL/DL subframe configuration and a flexible configuration in general. For example, a '11' in the neighbor cell configuration NCI may include a different UL/DL subframe allocation in neighboring cells for TDD or for non-full duplex FDD as compared to the UE's serving cell.

In the case of a half duplex and variable duplex mode UE, the network may not be able to use all the DL and/or UL sub-frames in a frame, in which case, the UE transmitter may cause self interference to the UE receiver. In that case, the typical number of sub-frames available for cell measurements by the UE may be reduced.

Example embodiments for an UL/DL subframe configuration include: (1) a number of allowed subframes (e.g., DL or UL) in a frame is specified for UE cell measurement, (2) a pre-defined pattern or a pre-defined configuration index corresponding to the allowed sub-frames available for the UE cell measurements, or (3) offset(s) for switching points from the beginning of the frame or relative to a previous switching point are indicated in addition to or instead of the typical neighbor cell configuration information. For example, instead of sending a neighbor cell configuration '11' (which may not be very useful), an exact configuration may be signaled for a given cell.

For a given cell or a set of cells, a pre-defined pattern may include a pre-defined configuration of allowed. UL/DL subframes for UE cell measurement and may be represented by a set of indicators indicating the availability of certain (DL and/or UL) subframes. For example, a string of 5 or 10 bits with '0's or '1's may be used with a '1' indicating a DL subframe. There may also be a set of pre-defined configurations and the corresponding set of configuration indexes, where a configuration index uniquely determines one of the pre-defined configurations. The extended neighbor cell subframe configuration information may be signaled for any combination of intra-frequency cells, inter-frequency cells, multi-carrier cells (aka carrier aggregation), and inter-RAT cells including LTE FDD and LTE TDD. The cells may be served by a base station or by any suitable network node such as a relay node or an access point.

eNCI may be signaled to the UE from base station nodes or from non-E-UTRAN systems for performing UE measurements on E-UTRA FDD or TDD, e.g., for performing measurements on E-UTRA FDD or TDD cells when the serving cell is on UTRAN, GSM, CDMA2000, HRPD or any other non-E-UTRAN RAT. eNCI may also be signaled between two network nodes, a UE and a network node, or two UEs.

In another example embodiment, a cell-specific timing offset may be configured for a cell or a group of cells and may be counted e.g. in full subframes. The cell timing offset configuration (e.g., a timing offset from a reference timing point) may be pre-defined or signaled. A cell timing offset may be configured for a cell or a group of cells and may be counted e.g. in full subframes. The offset may be defined with respect to a reference timing point which may be a reference system frame number (SFN) (e.g., SFN=0) or the beginning of a radio frame. Further, the offset may be (1) configured with respect to a serving/reference/donor cell for a given UE and therefore may be used with dedicated signaling, or (2) pre-configured and associated with a known cell characteristic (e.g., PCI), which may be used when the eNCI is cell- or area-specific and is broadcasted.

For example, one offset may be associated with PCIs for which mod(PCI,s)=0, another offset may be associated with PCIs for which mod(PCI,s)=1, etc. Such a mapping between offsets and a cell characteristic such as PCI may also be pre-defined. Otherwise, it may be signaled together with the cell or the cell group. The cell group may, for example, be configured with a step parameter or a mask or PCI range as described earlier.

In one example embodiment, a cell offset is defined relative to the beginning of the closest radio frame of a reference cell, which may or may not be the serving cell. In another example embodiment, absolute timing or relative timing offset, not necessarily counted in full subframes, may be signaled for a cell or a group of cells.

A subframe configuration for eICIC is another example of eNCI that may be defined by a pattern or a set of possible patterns, which may be configured or predefined. A pattern may comprise at least one of: a sequence of indicators (e.g. similar to those for UL/DL subframe configuration) to indicate subframes available for UE cell measurements, periodicity of the sequence (may or may not be equal to the sequence length), a reference time point for the sequence, and an offset with respect to the reference time point. Patterns may be defined separately for DL and UL. A UE also needs to know when and how an UL/DL subframe configuration applies in time. Given a measurement pattern of 0's and 1's of a certain length (e.g., 40 subframes) where '1' means "to measure in this subframe," the UE needs to know from which subframe the pattern applies. The counting may be from a subframe of a reference cell, e.g., the serving cell, or from a certain subframe of the cell for which the pattern is specified.

The sequence of indicators defining an eICIC pattern may also account for the duplex mode and the corresponding UL/DL configuration, e.g., the sequence '01010101' (or '01' with periodicity 2), where '1' indicates subframes for measurements in the pattern, together with UL/DL configuration 'DL-DL-DL-DL-UL-UL-UL-UL' give the resulting sequence '01010000' for DL and '00000101' for UL.

Another eNCI listed above is the number of cells for the UE to measure. Given that the number of cells in eNCI may be rather large and a lot of information may be redundant, the following configuration alternatives may be used for subframe configuration in eNCI. First, a default configuration may be assumed when no pattern is signaled. The default configuration may comprise one of: no muted subframes or no low-interference subframes and a pre-defined pattern, e.g., 01010101. Second, a pre-defined configuration index may be signaled. In the example above, indexes may be used for '01010101', '11110000', '00110011', or '00000000' (the latter denotes a fully muted cell), and the indexes may be either binary indexes '00', '01', '10' and '11' or the corresponding integer indexes 0, 1, 2 or 3. Third, a subframe configuration comprising at least one of sequence, offset, and periodicity may be defined.

Any of the configuration alternatives may apply for one or more of: a given cell, a group of cells, a certain type of cells or cell layer, a certain frequency or a group of frequencies, or a certain RAT(s). Furthermore, the configurations may be specified and signaled separately for DL and UL, and separately at least for control channels, reference signals, or data channels or any combination of the three.

Further, a set of neighbor cell configuration indicators may be determined with respect to a reference cell, which may or may not be the serving cell. Further example extensions include any combination of the following items: 0 or 00—not all neighbor cells have the same MBSFN subframe allocation as serving/reference cell; 1 (or 01 in binary)—no MBSFN subframes are present in all neighbour cells; 2 (or 10 in binary)—the MBSFN subframe allocations of all neighbour cells are identical to or subsets of that in the serving/reference cell; 3 (or 11 in binary)—different UL/DL allocation in neighbouring cells for TDD compared to the serving/reference cell; 4—not all neighbor cells use the same pattern as the serving/reference cell; 5—patterns configured in neighbor cells are either identical to or super sets of the serving/reference cell; 6—patterns configured in neighbor cells are either identical to or subsets of the serving/reference cell; 7—no patterns are present in any neighbor cell. The configuration indicators apply to cells with which the common information is associated, which may be all cells, all cells on specific frequency, a group of cells obtained with a mask, cells in a range, etc.

A subset of a sequence is illustrated by the following example. Given sequence A='01010101', the following example sequences B are super sets of the given sequence A: '11111111', '11111101', '11110101', '11010101', etc., i.e., the result of the bitwise binary AND-operation A&B contains A: A & B $\subseteq$ A. In other words, a sequence B has 1's in the bit positions where sequence A has 1's, and sequence B has 1's or 0's where sequence A has 0's.

An identical pattern may mean any combination of identical sequence, identical offset, etc., given that specific rules are determined for the remaining part(s) of the pattern configuration. The rules may be configured or pre-determined (e.g., by the standard). As a non-limiting example, an offset may be obtained via an operations and maintenance node (O&M), or it may be determined by a mapping to PCIs, while the pattern sequence may be determined by any of the rules above.

The eNCI may also include information on the cell type related to the power class of the cell's base station (e.g., macro, micro, pico, home base station, etc.). The information may be useful, e.g., to identify whether a neighbor cell in eNCI is a strong interferer (e.g., a femto cell may be a strong DL interferer for a non-CSG UE or a macro cell may be a strong interferer to a pico UE in the pico CRE), a victim (e.g., a femto UE may experience a strong interference in UL from a nearby macro UE), or just a normal neighbor. This information may be signaled for intra-frequency cells, inter-frequency and multi-carrier cells, and inter-RAT cells, including LTE FDD and LTE TDD. The cells may be served by a base station or by any suitable network node such as relay node or an access point. In addition eNCI may also be signaled to the UE from non-E-UTRAN systems for performing measurements on E-UTRA FDD or TDD e.g. for performing measurements on E-UTRA FDD or TDD cells when the serving cell is on UTRAN, GSM, CDMA2000, HRPD or any other non-E-UTRAN or non-3 GPP RAT.

Figure 6:
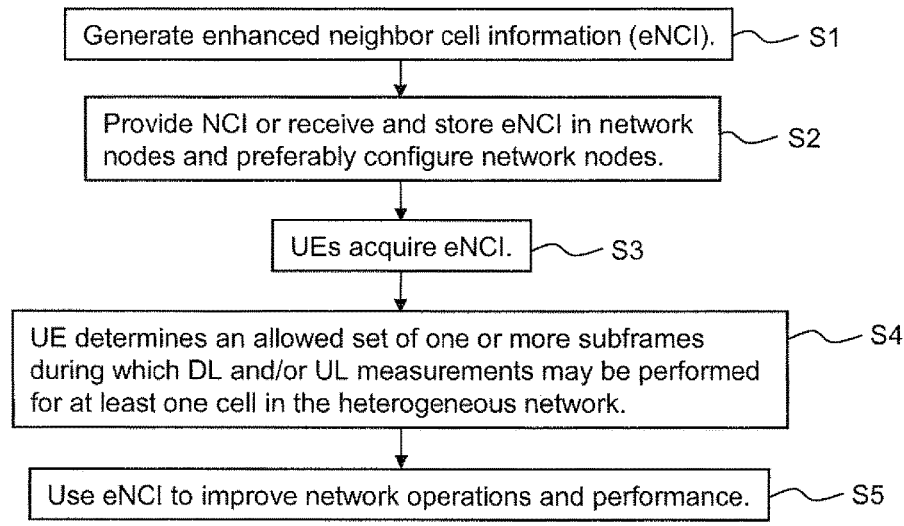
FIG. 6 illustrates a flowchart illustrating non-limiting example procedures regarding enhanced neighbor cell information (eNCI)

Once the eNCI is created by one or more network nodes, it is used to improve network operations and performance. FIG. 6 below illustrates general procedures. In step S1, enhanced neighbor cell information is generated as mentioned with non-limiting examples eNCI given above. The network node that generated the eNCI may provide it to UEs and/or other network nodes, and other network nodes may receive that eNCI and store it (step S2). The eNCI may be used to configure the network node in some desired fashion such that the network performance is improved by avoiding strong interference when it would otherwise occur. UEs also acquire eNCI in some way (non-limiting examples are described below) (step S3), and then use that acquired eNCI to determine an allowed set of one or more subframes during which DL and/or UL cell measurements may be performed for at least one cell in the heterogeneous network (step S4). For example, a UE receiving eNCI may configure its cell measurements to measure cells on a certain frequency and/or in a certain PCI range and/or of a certain type (e.g. power class) and/or cells having transmissions at times orthogonal or near-orthogonal to those used for the serving/reference cell transmission. In a second example, a UE receiving eNCI from another UE may configure its cell measurements according to the received eNCI, assuming that the two UEs are in the sufficiently close proximity of each other and have the same serving cell and thus the eNCI may be reused. As a third example, eNodeB-created eNCI for a UE stores this eNCI and reuses it for other UEs (e.g., no need to create it separately for at least one UE different from the first one). These other UEs are expected to be in the same area as deduced from the UE's position estimation or measurements from one or more cells (e.g., some signal strengths/quality and/or timing advance and/or angle of arrival). Ultimately, the eNCI is used by one or more network nodes and/or one or more of the UEs to improve overall network operations and perform (step S5).

Figure 7:
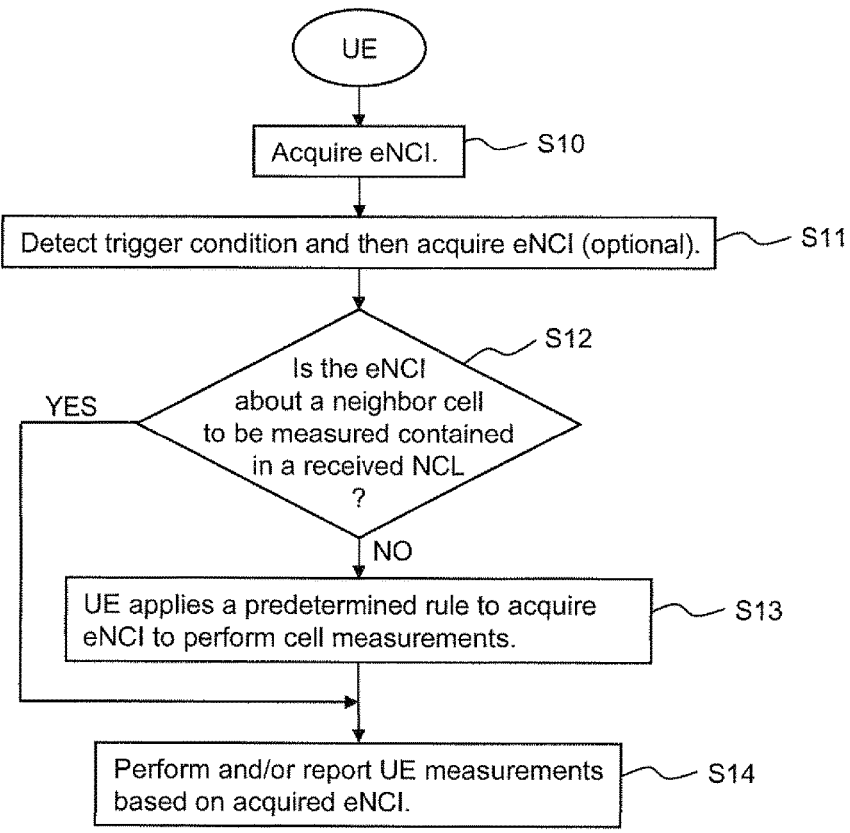
FIG. 7 illustrates a flowchart illustrating non-limiting example procedures relating to enhanced neighbor cell information (eNCI) from a UE perspective.

FIG. 7 is a flowchart illustrating procedures for UEs. First, a UE acquires eNCI (step S10). There are various ways to acquire eNCI. First, the UE may have stored pre-defined eNCI or predetermined rules for determining eNCI (described further below). Second, the UE may receive eNCI through signaling from the network (examples of such signaling are described below). Third, there may be a triggering condition that triggers signaling and/or use of eNCI to/by the UE. Fourth, any combination of the first three acquiring options may be used. Step S11 is a subset of step S10 that highlights an optional example situation where the UE detects a trigger condition and in response acquires eNCI. A determination is made in step S12 if eNCI about a neighbor cell the UE is to measure is contained in a NCL received by the UE. If so, control proceeds to step S14 where the UE performs and/or reports UE cell measurements based on acquired eNCI. If not, the UE applies one or more predetermined rules to acquire eNCI and proceeds to step S14.

Signaling technology for communicating eNCI among different network nodes and terminal is now described. The signaling may also be used for any other neighbor cell information. The signaled eNCI, at least in some parts, may be organized as a combination of a list of intra-frequency cells and parameters (intra-frequency eNCI). In one example embodiment, the parameters are cell-specific, and in another example embodiment, the signaled parameters are common for all intra-frequency cells. The signaled eNCI, at least in some parts, may be organized as a list of inter-frequency cells and parameters (inter-frequency or multi-carrier eNCI). In one embodiment, the parameters are cell-specific, and in another embodiment, the signaled parameters are common for all cells for at least one frequency that is different from the serving cell frequency. The signaled eNCI, at least in some parts, may be organized as a list of inter-RAT cells and parameters (inter-RAT eNCI). In one example embodiment, the signaled eNCI, at least in some parts, may be organized so that the parameters are cell-specific, and in another example embodiment, the signaled parameters are common for all cells for at least one RAT that is different from the serving cell frequency.

In one example embodiment, eNCI comprises any combination of the three eNCI levels described above (e.g., intra-frequency, inter-frequency, and inter-RAT), which may or may not reuse the NCI described in the background section.

Signaling, e.g., lower-layer and/or higher-layer signaling, may be used for communicating eNCI. In the examples described below, signaling is specified between network nodes as well as between the network and a UE. The signaling of eNCI may be specified and implemented as dedicated, per-UE signaling or as cell-specific signaling for all UEs in the cell or a group of UEs in the cell.

The enhanced neighbor cell information (eNCI) may be built up in radio network nodes (e.g., eNodeBs, pico base stations, home eNodeBs, relays, etc.) or other network nodes such as a node implementing centralized or semi-centralized interference coordination or resource management functionality (further referred to as a central node) or any other node capable of performing eNCI creation, e.g., a core network node. The build up of eNCI may also be implemented in network nodes performing network planning, network optimization function or automated functions; examples of such nodes are self organizing network (SON) node, O&M node, a node coordinating network activities related minimizing drive tests, etc.

The eNCI or parts thereof may then be communicated to other radio base stations (e.g., over X2 interface, O&M interface, SON interface, etc. to enhance, e.g., general RRM functionalities or some specific functionalities, e.g., positioning), to a relay node either directly or via donor node controlling relay node, to terminals acting as wireless relays (e.g., over RRC) or to a network node such as a central node or nodes with a specific functionality, e.g., a positioning node such as an E-SMLC where the neighbor cell information, either for a UE or cell-specific, may be communicated to a positioning node to enhance building up, e.g., OTDOA assistance data.

The eNCI or parts of it may also be signaled to network nodes belonging to other RATs, e.g., RNC and Node B of UTRAN, BSC, BTS or base station in GSM, BSC or base station in CDMA2000 or HRPD systems, LTE TDD or LTE FDD, etc. These nodes of other RATs may then signal the eNCI information to the UE, which in turn may use this information for performing cell measurements (e.g. RSRP, RSRQ etc) on E-UTRAN cells.

The eNCI may also be sent in a transparent container, which may be then further relayed to other network nodes or UEs. One such example is when a neighbor cell sends information about itself to a serving cell of a UE, and the serving cell further transmits that information to the UE. The information obtained in this a way may be utilized by the UE, e.g., to organize its measurements or to enhance mobility and handover.

A UE may acquire eNCI any number of ways, some examples of which are described above including via a serving cell (e.g. over RRC), via a 'master' cell, via a donor cell (for relays), via a neighbor cell when the UE is able to connect to more than one cell (e.g. soft handover) or when the serving cell cannot provide such eNCI (e.g. when there is no X2 or backhaul radio link as with user-deployed CSG home eNodeBs) but may be able to provide details of the neighbor cell for acquiring eNCI in the area, via other network node, e.g., a central node or a gateway node (e.g. for home eNodeBs), via dedicated UE-specific signaling, via broadcast cell-specific signaling, or via other terminals or devices using terminal-to-terminal communication or device-to-device communication.

Triggering conditions for initiating eNCI transmission are now described. Dedicated transmissions are typically unicast transmissions that are typically aperiodic and event-triggered. Broadcast transmissions may be periodic transmissions. The eNCI may be sent either for any cell or only for specific cells and either for all UEs or specific UEs only. In one example embodiment, eNCI is sent only for cells associated with low-power nodes, e.g., pica BSs or home eNodeBs. In another example embodiment, eNCI is sent specifically to UEs experiencing or expected to experience bad service quality, e.g., the UEs in an expanded part of a defined cell range.

Several possible example triggers for signaling dedicated eNCI are now identified. One example trigger is when the UE enters a particular part of the cell, e.g., an expanded part of the cell range. Other example triggers include: the UE is found to be in proximity of a home eNodeB to which it is not able to connect, e.g., in the coverage area of a CSG cell; the UE experiences bad performance over a certain period of time; a certain load unbalance is identified between two neighbor cells and eNCI is signaled in the less loaded cell to instruct the UEs to apply a cell reselection rule so that the cell range of the less loaded cell is expanded. Further example triggers might be: whenever any information content of the eNCI is changed; after and/or before the UE performs handover (e.g., intra-frequency, inter-frequency or inter-RAT) or at the primary carrier change or the primary RAT change; or after the UE performs RRC re-establishment after the radio link failure or changing the RRC state in general. The dedicated signaling of NCI or eNCI may be triggered at the UE (accomplished with sending a request for the NCL/eNCL) or at the network side.

Possible example triggers for broadcasting cell-specific eNCI include: a certain number of UEs supporting eNCI (e.g., 1 UE in a special case or K UEs in a more general case where K is a positive integer) in the expanded part of the cell range; a certain number of UEs supporting eNCI experiencing bad performance over a certain period of time; a certain load unbalance identified between two neighbor cells and eNCI is signaled in the less loaded cell to instruct the UEs to apply the cell reselection rule so that the cell range of the less loaded cell is expanded; or a cell configuration has changed (e.g., powered up or changed the maximum transmit power level which may also require that the NCL or eNCL is updated before transmitting).

The eNCI may also be transmitted for minimization of drive tests or for positioning purpose, e.g., to enhance measurements for fingerprinting or AECID methods, and the transmission may therefore be triggered by the UE or a network node in connection to the corresponding session, e.g., positioning session.

The acquired eNCI may be stored in the UE for up to a certain time and then deleted from the memory or updated with the new/updated neighbor cell information, which may be requested upon the expiry of the stored neighbor cell information.

Another aspect of the technology is useful in situations where the eNCI is not available or only partially available or if it is indicated that the UE may override the eNCI by pre-defined eNCI information. In that case, the UE may use the pre-defined rules for performing measurements on the serving and/or neighbor cells. Another possibility is that the UE may use signaled eNCI information as well as pre-defined rules in controlling how the UE makes cell measurements. Neighbor cells may refer to intra-frequency, inter-frequency, or inter-RAT cells.

Non-limiting examples of such pre-defined rules are now described. One or more default configurations for eNCI may be pre-defined. The default configuration includes at least identification of allowed DL subframes for cell measurements in a frame. Allowed UL subframes may also be included. The default configuration may be defined as common for all carrier frequencies including the serving cell frequency (or intra-frequency) or as different for different carriers or RATs. The following are non-limiting example rules for possible use. First, the UE may use the default configuration for performing measurements on all cells including the serving cell and neighboring cells. Second, the UE may use the default configuration for performing measurements only on the neighboring cells in case the eNCI is signaled by the serving cell for serving cell measurements. Third, if there is more than one default configuration, then the serving cell may indicate which default configuration to use for performing the measurements on all cells or on the neighbor cells. Fourth, the default configuration may be pre-defined for a group of cells by mapping the eNCI configuration to the cell ID in the form of pre-defined mapping tables. For example, a particular number of cell groups may be used such as a serving (may be primary and secondary serving cells with CA) cell group and a neighbor cell group. Neighbor cells may be further split into, e.g., intra-frequency, inter-frequency, inter-RAT cell groups, and, e.g., for cells operating on the same RAT and the same frequency. The number of groups may depend on the total number of cells to be measured and the number of cells that may be measured in parallel. For example, cells with a different PCI reuse factor may be measured in parallel since they may interfere less with each other and thus may be allowed to transmit simultaneously. After identifying the cell, the UE may use a pre-defined mapping table to determine which configuration is to be used for performing measurements on the identified cell. The default configuration may be the same or different for different types of cells or power class (e.g., micro, pico, home, etc). The default configuration may also be same or different for different carrier frequencies.

In another example embodiment, the pre-defined rules define UE behavior such that the UE uses a specific configuration for performing measurements on all cells or only on neighbor cells such as the most stringent configuration containing a least number of DL frames that may be used for measurements in a frame or over a time period. The specific configuration may also be defined in a standard.

This example embodiment uses default or specific configuration for measuring cells not in a NCL or provided eNCI. A UE may blindly detect a cell whose PCI is not included in the NCL or in the eNCI provided to the UE by the serving cell. This embodiment explains one way the UE may perform measurements on such blindly detected cells whose eNCI or configuration is not available. One of the following rules may apply: the UE may use a default configuration for performing measurements on cells whose eNCI is not available; the UE may use a specific pre-defined configuration (e.g. least number of DL sub-frames in a frame) for performing measurements on cells whose eNCI is not available; the UE may use the eNCI configuration of the serving cell for performing measurements on cells whose eNCI is not available; or for performing measurements on cells whose eNCI is not available, the UE may the configuration which is similar to or identical to the configurations used in majority of the cells whose eNCI is provided to the UE.

It may be pre-defined that the measurement requirements for various types of measurements (examples are described below) should apply for certain configurations. For example, it may be specified that:
1-Intra-frequency RSRP/RSRQ measurements shall apply a provided K (e.g., K=1 or K=2) DL sub-frames are available for measurements in a frame provided cell bandwidth (BW) is larger than X MHz (e.g., X=1.4 MHz).
2-Inter-frequency RSRP/RSRQ measurements shall apply a provided Li (e.g., L1=2 or L1=4) number of DL sub-frames are available in a frame provided cell BW is larger than X MHz (e.g. X=1.4 MHz).
3-Inter-frequency RSRP/RSRQ measurements shall apply a provided L2 (e.g., L2=1 or L2=2) number of DL sub-frames are available in a frame provided cell BW is larger than Y1 MHz (e.g., Y1=5 MHz).

The disclosed technology may also be implemented in test equipment.

Non-limiting examples of UE cell measurements referred to above are now described. Measurements may be performed on specific pilot signals such as synchronization signals, reference signals, positioning reference signals, dedicated reference signals etc. The measurements refer to any type of UE measurements used for mobility; examples are cell identification or PCI identification, cell global ID identification, cell global ID (CGI) or evolved CGI (ECGI) identification, RSRP, RSRQ etc. The measurements may also refer to positioning related measurements such as RSTD, UE Rx-Tx time difference measurements etc. The measurements may also refer to those performed for specific purposes like minimization of drive tests (e.g. paging channel quality or failure rate, broadcast channel quality or failure rate etc) or for SON etc. These measurements may be performed on intra-frequency frequency, inter-frequency or inter-RAT (e.g. E-UTRA TDD or FDD) or inter-RAT E-UTRA cell measured from other RATs (e.g. when serving cell is UTRA, GSM, CDMA2000 or HRPD etc).

The measurements may also refer to those performed by the UE for assisting functions such as scheduling, link adaptation etc. Examples of such measurements are channel state information (CSI) measurements or more specifically CQI, rank indicator, recommended layers for multi-antenna transmission, etc. The measurements may also refer to those performed by the UE for the maintenance of serving cell quality or link performance. Examples of such measurements out of sync detection, in sync detection, radio link monitoring, channel estimation measurements, etc. The measurements may also refer to those performed by the BS on the signals transmitted by the UE or by other nodes for various purposes such as for uplink interference measure, load estimation, propagation delay, mobility, positioning (e.g., eNodeB RX-TX time difference measurement, angle of arrival of signal, timing advance, etc).

The cell measurement requirements may include accuracy of the measurement quantities (e.g., RSRP accuracy), time to identify a cell (e.g. PCI or CGI detection delay), out of sync or in sync detection delay, CSI quality or CSI reporting time, etc.

Figure 8:
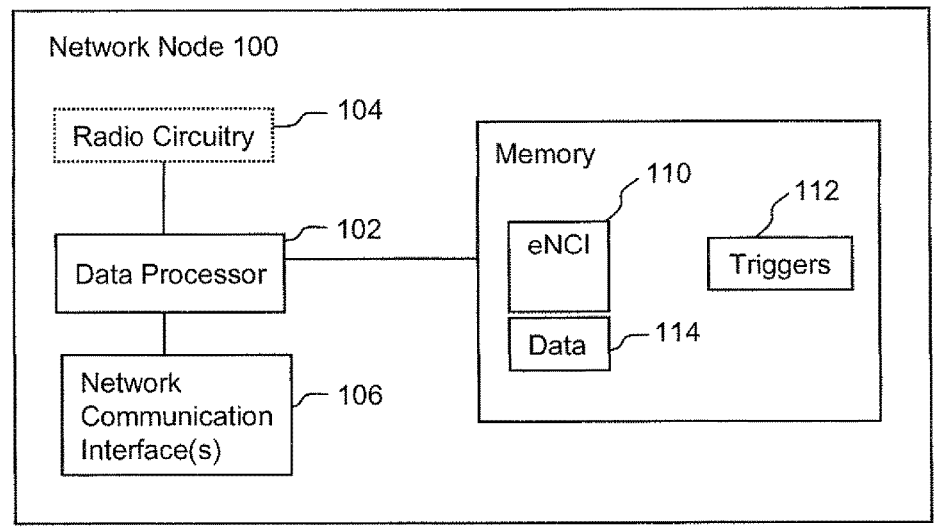
FIG. 8 is a non-limiting example function block diagram for a network node.

FIG. 8 is a function block diagram of a network node 100 that may be used to implement network-related operations regarding eNCI, examples of which are described above. A data processor 102 controls overall operation of the network node. The network node 100 may be a radio network node (some sort of base station or access point) and thus include radio communications circuitry 104. Alternatively or additionally, the network node 100 may be a core network or other network node in which case radio circuitry may not needed unless that node communicates wirelessly. The data processor 102 connects to one or more network communication interface(s) 106 and to memory 108. The memory 108 includes in addition to program instructions eNCI 110, one or more triggers 112, and other data 114.

Figure 9:
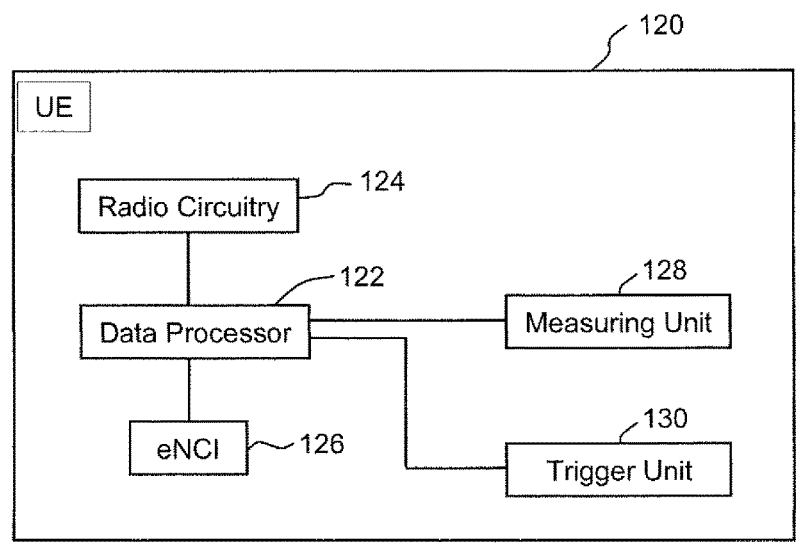
FIG. 9 is a non-limiting example function block diagram for a UE.

FIG. 9 is a function block diagram of a UE node that may be used to implement UE-related operations regarding the acquisition and/or use of eNCI, examples of which are described above. The UE 120 includes a data processor 122 that controls the overall operation of the UE and is coupled to radio circuitry 124 for making and receiving radio communications, e.g., with a radio access network. The processor 122 is coupled to memory that stores acquired eNCI as described in FIG. 7. Data processor 122 is also coupled to a measuring unit 128 and a trigger unit 130 which are shown as separate units from the processor 122 but whose functions may be performed by the data processor 122 if desired. The measuring unit 128 makes and/or reports to the network cell and/or other radio-related measurements based at least in part on the eNCI 126. The trigger unit 130 detects occurrence of one or more trigger conditions that may result in the measuring unit 128 making and/or reporting a measurement. If eNCI is old (e.g., the UE checks a time stamp), then a trigger for requesting new/updated eNCI is triggered, and the UE postpones using the eNCI (and thus the measurements based on it) until the eNCI is updated.

There are many advantages to the technology described including, for example, enhanced neighbor cell information designed for heterogeneous networks, specified signaling for neighbor cells information, resource-efficient signaling methods for communicating the neighbor cell information enhancing heterogeneous network performance, per-defined rules and UE behavior are specified and related to measurement requirements, etc. The technology facilitates UE measurements in heterogeneous network deployments and enables more reliable and higher quality measurements.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described embodiments that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method in a radio user equipment (UE) performing measurements on a serving cell and at least one neighbor cell in a heterogeneous wireless communications network that includes one or more higher power radio network nodes operating near one or more lower power radio network nodes, the method comprising:

acquiring enhanced neighbor cell information for one or more neighbor cells, wherein the enhanced neighbor cell information comprises downlink subframe information associated with one of the one or more neighbor cells and a set of cells for the UE to measure, wherein the set of cells for the UE to measure is identified by a range of cell identifiers, the range of cell identifiers comprising a starting cell identifier and a step factor:

determining an allowed set of one or more subframes during which downlink and/or uplink measurements may be performed for at least one neighbor cell in the heterogeneous network from the acquired enhanced neighbor cell information, wherein the allowed set of one or more subframes correspond to a time of reduced radio interference from the one or more higher power radio network nodes which facilitates downlink or uplink measurements for the least one neighbor cell; and using the acquired enhanced neighbor cell information to perform measurements on the at least one neighbor cell in the heterogeneous network during the allowed set of one or more subframes.

2. The method in claim 1, wherein a number of the allowed set of one or more subframes in a frame is less than a total number of subframes in the frame.

3. The method in claim 1, wherein acquiring the enhanced neighbor cell information comprises obtaining the enhanced neighbor cell information from a received message received from a radio network node.

4. The method in claim 1, wherein acquiring the enhanced neighbor cell information comprises obtaining or complementing the enhanced neighbor cell information based on predetermined rules stored in the UE.

5. The method in claim 4, wherein according to one of the predetermined rules, using enhanced neighbor cell information corresponding to a configuration of the serving cell for performing measurement on at least one neighbor cell.

6. The method in claim 4, wherein according to one of the predetermined rules, the UE uses the same enhanced neighbor cell information for performing measurement on multiple cells.

7. The method in claim 4, wherein the multiple cells are on a same frequency or a different frequency and belong to a same radio access technology, RAT, or a different RAT.

8. The method in claim 4, wherein the enhanced neighbor cell information for performing measurements on neighboring cells is one of: a subset of the enhanced neighbor cell info nation for performing measurements on a serving cell, a superset of the enhanced neighbor cell information for performing measurements on the serving cell, or the same as the enhanced neighbor cell information for performing measurements on the serving cell.

9. The method in claim 1, wherein the enhanced neighbor cell information includes an allowed set of uplink, UL, and/or downlink, DL, subframes during which the UE may make cell measurements in the heterogeneous network.

10. The method in claim 9, wherein the allowed set of UL and/or DL subframes is designated using an UL and/or DL subframe configuration that supports a non-full duplex mode of operation.

11. The method in claim 1, wherein the enhanced neighbor cell information includes one or more of the following: intra-frequency cell information for performing intra-frequency measurements, multi-carrier cell information for performing inter-frequency measurements and/or carrier aggregation measurements, multi-radio access technology, RAT, information for performing inter-RAT measurements, or a set of frequencies for the UE to measure.

12. The method in claim 1, further comprising separately acquiring enhanced neighbor cell information for performing measurement on a serving cell, on intra-frequency neighbor cells, on inter-frequency neighbor cells, and on inter-RAT neighbor cells.

13. The method in claim 1, wherein the enhanced neighbor cell information includes multiple ones of the following: an allowed set of one or more uplink subframes during which the UE may make cell measurements in the heterogeneous network and/or an allowed set of one or more downlink subframes during which the UE may make cell measurements in the heterogeneous network, where the allowed set of uplink, UL, and/or downlink, DL, subframes is designated using at least one of: an UL/DL subframe configuration that supports a non-full duplex mode of operation, cell-specific timing offset information, cell type indication for each cell to be measured, intra-frequency cell information, multi-carrier cell information, multi-radio access technology, RAT, information, a number of cells for the UE to measure, a number of frequencies for the UE to measure, or a cell identifier enabling enhanced cell information.

14. A method in a network node in a heterogeneous network that includes one or more higher power radio network nodes operating near one or more lower power radio network nodes, the method comprising:
generating enhanced neighbor cell information for one or more neighbor cells, wherein:
the enhanced neighbor cell information comprises downlink subframe information associated with one of the one or more neighbor cells and a set of cells for a user equipment (UE) to measure, wherein the set of cells for the UE to measure is identified by a range of cell identifiers, the range of cell identifiers comprising a starting cell identifier and a step factor;
the enhanced neighbor cell information comprises information from which the UE may determine an allowed set of radio transmission subframes during which the UE may make downlink and/or uplink cell measurements for at least one neighbor cell in the heterogeneous network, wherein during the allowed set of radio transmission subframes, radio interference from the one or more higher power radio network nodes is reduced to facilitate the UE measurements for the at least one neighbor cell in the heterogeneous network; and
providing the enhanced neighbor cell information for the UE to coordinate UE measurements on the at least one neighbor cell in the heterogeneous network during the allowed set of one or more subframes.

15. The method in claim 14, wherein a number of the allowed set of subframes in a frame is less than a total number of subframes in a frame.

16. The method in claim 14, further comprising sending the enhanced neighbor cell information to another network node in the heterogeneous network.

17. The method in claim 14, wherein the enhanced neighbor cell information includes one or more of the following: an allowed set of uplink subframes during which the UE may make cell measurements in the heterogeneous network, where the allowed set of subframes is designated using an UL/DL subframe configuration that supports a non-full duplex mode of operation, cell-specific timing offset information, cell type indication for each cell to be measured, intra-frequency cell information, multi-carrier cell information, multi-radio access technology (RAT) information, a number of cells for the UE to measure, a number of frequencies for the UE to measure, or a non-continuous block of cell identifiers.

18. The method in claim 14, further comprising separately providing enhanced neighbor cell information to the serving cell, intra-frequency neighbors, inter-frequency neighbors, and inter-RAT neighbors.

19. A network node for a heterogeneous network that includes one or more higher power radio network nodes operating near one or more lower power radio network nodes, the network node comprising electronic circuitry configured to:
generate enhanced neighbor cell information for one or more neighbor cells, wherein:
the enhanced neighbor cell information comprises downlink subframe information associated with one of the one or more neighbor cells and a set of cells for a user equipment (UE) to measure, wherein the set of cells for the UE to measure is identified by a range of cell identifiers, the range of cell identifiers comprising a starting cell identifier and a step factor;
the enhanced neighbor cell information comprises information from which the UE may determine an allowed set of downlink radio transmission subframes during which the UE may make downlink and/or uplink cell measurements for at least one neighbor cell in the heterogeneous network, wherein during the allowed set of downlink radio transmission subframes, radio interference from the one or more higher power radio network nodes is reduced to facilitate the UE measurements for the at least one neighbor cell in the heterogeneous network; and
provide the enhanced neighbor cell information for the UE to coordinate UE measurements on the at least one neighbor cell in the heterogeneous network during the allowed set of one or more subframes.

20. The network node in claim 19, wherein the electronic circuitry is configured to send the enhanced neighbor cell information to another network node in the heterogeneous network.

21. The network node in claim 19, wherein the network node is one of a radio base station, a relay, a base station controller, a radio network controller, a core network node, a positioning node, or test equipment.

22. The network node in claim 19, wherein the coordination includes reducing interference from the one or more higher power cells during the allowed downlink subframes.

23. The network node in claim 19, wherein the enhanced neighbor cell information includes one or more of the following: an allowed set of uplink subframes during which the UE may make cell measurements in the heterogeneous network, where the allowed set of subframes is designated using an UL/DL subframe configuration that supports a non-full duplex mode of operation, cell-specific timing offset information, cell type indication for each cell to be measured, intra-frequency cell information, multi-carrier cell information, multi-radio access technology (RAT) information, a number of cells for the UE to measure, a number of frequencies for the UE to measure, or a non-continuous block of cell identifiers.

24. A radio user equipment (UE) configured to perform measurements on a serving cell and at least one neighbor cell in a heterogeneous network that includes one or more higher power radio network nodes operating near one or more lower power radio network nodes, the UE comprising: radio circuitry;
  cell measurement circuitry; and
  processing circuitry coupled with the radio circuitry and cell measurement circuitry and configured to:
  (1) acquire enhanced neighbor cell information for one or more neighbor cells, wherein the enhanced neighbor cell information comprises downlink subframe information associated with one of the one or more neighbor cells and a set of cells for the UE to measure, wherein the set of cells for the UE to measure is identified by a range of cell identifiers, the range of cell identifiers comprising a starting cell identifier and a step factor;
  (2) determine an allowed set of one or more subframes during which downlink and/or uplink measurements may be performed for at least one neighbor cell in the heterogeneous network from the acquired enhanced neighbor cell information, wherein the allowed subframes are subframes specific to the heterogeneous network during which interference from the one or more higher power radio network nodes is reduced to allow the UE make cell measurements on the at least one neighbor cell, and
  (3) use the acquired information to perform measurements on the at least one neighbor cell in the heterogeneous network during the allowed set of one or more subframes.

25. The UE in claim 24, wherein the radio circuitry is configured to receive signals from a network node in the heterogeneous network that include the enhanced neighbor cell information.

26. The UE in claim 24, wherein the processing circuitry is configured to obtain or complement the enhanced neighbor cell information based on predetermined rules stored in the UE.

27. The UE in claim 24, wherein the enhanced neighbor cell information for performing measurements on neighboring cells is one of: a subset of the enhanced neighbor cell information for performing measurements on a serving cell, a superset of the enhanced neighbor cell information for performing measurements on the serving cell, or the same as the enhanced neighbor cell information for performing measurements on the serving cell.

28. The UE in claim 24, wherein the enhanced neighbor cell information includes an allowed set of uplink, UL, and/or downlink, DL, subframes during which the UE may make cell measurements in the heterogeneous network.

29. The UE in claim 24, wherein the enhanced neighbor cell information includes one or more of the following: intra-frequency cell information for performing intra-frequency measurements, multi-carrier cell information for performing inter-frequency measurements and/or carrier aggregation measurements, multi-radio access technology, RAT, information for performing inter-RAT measurements, or a set of frequencies for the UE to measure.

* * * * *

UNITED STATES PATENT AND TRADEMARK OFFICE
CERTIFICATE OF CORRECTION

PATENT NO. : 9,642,021 B2  
APPLICATION NO. : 13/127266  
DATED : May 2, 2017  
INVENTOR(S) : Siomina et al.

Page 1 of 3

It is certified that error appears in the above-identified patent and that said Letters Patent is hereby corrected as shown below:

On the Title Page

On Page 2, in Item (56), under "U.S. PATENT DOCUMENTS", in Column 1, Line 2, delete "Lindoff" and insert -- Lindoff et al. --, therefor.

On Page 2, in Item (56), under "OTHER PUBLICATIONS", in Column 2, Line 23, delete "R1-104819)," and insert -- (R1-104819), --, therefor.

In the Drawings

In Fig. 8, Sheet 4 of 4, delete " 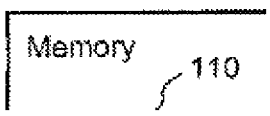 " and insert -- 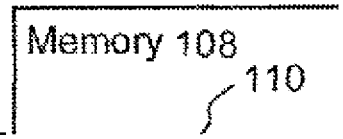 --, therefor.

In the Specification

In Column 1, Line 34, delete "3 GPP," and insert -- 3GPP, --, therefor.

In Column 1, Line 58, delete "area. BS is interchangeably termed a macro" and insert -- area BS is interchangeably termed as macro --, therefor.

In Column 2, Lines 38-39, delete "3 GPP" and insert -- 3GPP --, therefor.

In Column 2, Line 50, delete "3 GPP" and insert -- 3GPP --, therefor.

Signed and Sealed this  
Thirty-first Day of October, 2017

Joseph Matal  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 9,642,021 B2

In Column 2, Line 58, delete "3 GPP" and insert -- 3GPP --, therefor.

In Column 3, Line 9, delete "3 GPP" and insert -- 3GPP --, therefor.

In Column 3, Line 55, delete "3 GPP" and insert -- 3GPP --, therefor.

In Column 4, Line 22, delete "SystemInfonnation-" and insert -- SystemInformation- --, therefor.

In Column 4, Line 33, delete "3 GPP" and insert -- 3GPP --, therefor.

In Column 4, Line 48, delete "SystemInfonnationBlock-" and insert -- SystemInformationBlock- --, therefor.

In Column 4, Line 51, delete "3 GPP" and insert -- 3GPP --, therefor.

In Column 5, Line 6, delete "3 GPP" and insert -- 3GPP --, therefor.

In Column 5, Line 15, delete "3 GPP" and insert -- 3GPP --, therefor.

In Column 5, Line 34, delete "3 GPP" and insert -- 3GPP --, therefor.

In Column 7, Line 30, delete "a heterogeneous" and insert -- in a heterogeneous --, therefor.

In Column 7, Line 57, delete "applications" and insert -- application --, therefor.

In Column 8, Line 43, delete "3 GPP" and insert -- 3GPP --, therefor.

In Column 8, Line 53, delete "3 GPP (3 rd" and insert -- 3GPP (3rd --, therefor.

In Column 9, Line 51, delete "heterogenous" and insert -- heterogeneous --, therefor.

In Column 11, Line 37, delete "allowed." and insert -- allowed --, therefor.

In Column 12, Line 59, delete "'01," and insert -- '01', --, therefor.

In Column 13, Line 47, delete "CRE)," and insert -- CRS), --, therefor.

In Column 13, Line 59, delete "non-3 GPP" and insert -- non-3GPP --, therefor.

In Column 16, Line 11, delete "pica" and insert -- pico --, therefor.

In Column 18, Line 14, delete "Li" and insert -- L1 --, therefor.

In the Claims

In Column 20, Line 10, in Claim 1, delete "factor:" and insert -- factor; --, therefor.

CERTIFICATE OF CORRECTION (continued)
U.S. Pat. No. 9,642,021 B2

In Column 20, Line 50, in Claim 8, delete "info nation" and insert -- information --, therefor.

In Column 23, Line 2, in Claim 24, delete "radio" and insert the same at Line 3, before "circuitry;" as a new sub-point.

In Column 23, Line 25, in Claim 24, delete "cell, and" and insert -- cell; and --, therefor.